US009116588B2

(12) United States Patent
Heo

(10) Patent No.: US 9,116,588 B2
(45) Date of Patent: Aug. 25, 2015

(54) SIGNAL PROCESSING CIRCUIT OF TOUCH SCREEN

(71) Applicant: DONGBU HITEK CO., LTD., Seoul (KR)

(72) Inventor: Woon Hyung Heo, Asan-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 246 days.

(21) Appl. No.: 13/803,243

(22) Filed: Mar. 14, 2013

(65) Prior Publication Data

US 2014/0247241 A1  Sep. 4, 2014

(30) Foreign Application Priority Data

Mar. 4, 2013 (KR) .................. 10-2013-0023051

(51) Int. Cl.
G06F 3/041 (2006.01)
G06F 3/044 (2006.01)
G06F 3/0488 (2013.01)

(52) U.S. Cl.
CPC .............. *G06F 3/044* (2013.01); *G06F 3/0412* (2013.01); *G06F 3/0488* (2013.01)

(58) Field of Classification Search
None
See application file for complete search history.

(56) References Cited

U.S. PATENT DOCUMENTS

| 8,736,573 | B2 | 5/2014 | Byun et al. |
| 2011/0193817 | A1 | 8/2011 | Byun et al. |
| 2013/0141348 | A1* | 6/2013 | Jamshidi-Roudbari et al. ............. 345/173 |

FOREIGN PATENT DOCUMENTS

| KR | 1020110091380 A | 11/2011 |
| KR | 1020120078355 A | 10/2012 |

OTHER PUBLICATIONS

Office Action dated Jul. 31, 2014 from the Korean Intellectual Property Office in corresponding Korean Patent Application No. 10-2013-0023051; 4 pages.
English translation of Korean Patent Abstract: "Method and Apparatus for Compensating Noise in a Touch Panel Including a Touch Controller"; Publication No. 1020110091380 A; Publication date: Nov. 8, 2011.
English translation of Korean Patent Abstract; "Sensing Circuit of a Touch Panel and a Sensing Method for the Same Capable of Using Parasitic Capacitance"; Publication No. 1020120078355 A; Publication date: Oct. 7, 2012.

* cited by examiner

*Primary Examiner* — Muhammad N Edun
(74) *Attorney, Agent, or Firm* — Andrew D. Fortney; Central California IP Group, P.C

(57) ABSTRACT

A signal processing circuit of a touch screen is provided. The signal processing circuit can include driving and sensing lines arranged to interact with one another in a touch screen panel, power sources supplying power to each of the driving lines, and sensing channels detecting touch by sensing a mutual capacitance on a node where the sensing line interacts with the driving line. The circuit can also include driving line switches selectively connecting the power sources to the driving lines, channel switches selectively connecting the sensing channels to the sensing lines, and a bypass line allowing the driving line to be connected to the sensing line by operation of the channel switches.

20 Claims, 7 Drawing Sheets

SIGNAL PROCESSING CIRCUIT OF TOUCH SCREEN

CROSS-REFERENCE TO RELATED APPLICATION

This application claims the benefit under 35 U.S.C.§119 of Korean Patent Application No. 10-2013-0023051, filed Mar. 4, 2013, which is hereby incorporated by reference in its entirety.

BACKGROUND

On a touch screen display device, a user may perform an input operation by touching any point on the screen with a stylus pen or a finger. To this end, in addition to a plurality of pixels for displaying an image, the touch screen display device includes a plurality of touch sensing elements to sense a point which a user touches.

A drive signal and a data signal are applied to each pixel, and each touch sensing element senses a touch by a user and outputs a corresponding sensing signal. To this end, the touch screen display device includes a drive driving unit and a data driving unit for applying a drive signal and a data signal, and a sensing line signal processing circuit for processing an output signal of each touch sensing element that is output to a sensing line.

FIG. 1 is a view of a related art sensing line signal processing circuit of a touch screen. Referring to FIG. 1, a related art processing circuit includes sensing read circuit units 10A, 10B, ..., 10N, a switch unit 20, and an A/D converter 30. Each sensing read circuit unit 10A to 10N includes a sensor capacitor Cs, a pre-charge switch PC, a readout switch RO, and an analog sensing channel 11, The sensor capacitor Cs is connected to a plurality of sensing lines that are arranged on a touch screen panel in one direction, for example, in a vertical direction. A component Cp between a ground terminal and a pad around the sensor capacitor Cs is a parasitic capacitor.

The pre-charge switch PC is turned on in a pre-charge mode for a given time and thus a power supply terminal voltage VDD is pre-charged in the sensor capacitor Cs through the pre-charge switch PC.

Subsequently, the readout switch RO is turned on in a readout mode for a given time and thus the voltage charged in the sensor capacitor Cs is transferred to the analog sensing channel 11 through the readout switch RO.

However, if the sensor capacitor Cs is touched by a user on the touch screen panel, a distance between its electrode plates narrows and thus a capacitance changes. Accordingly, the voltage transferred from the sensor capacitor Cs to the analog sensing channel 11 decreases.

The analog sensing channel 11 integrates an input voltage to generate a corresponding touch sensing output voltage Vout1. In this case, the touch sensing output voltage Vout1 of the analog sensing channel 11 corresponds to a value that is obtained by dividing an input charge by a capacitance of a feedback capacitor $C_{FB}$. That is, an integral value of the sensing line currents becomes an output charge.

As described above, an absolute value comparison technique is typically applied, in which a voltage of the sensor capacitor Cs connected to one touch line is compared with a reference voltage Vref at an operational amplifier OP of the analog sensing channel 11, and a corresponding touch sensing output voltage Vout1 is determined.

For example, a sensing read circuit unit 10A generates a touch sensing output voltage Vout1 of one touch line through these processes and generates touch sensing output voltages Vout2 to Voutn of the other touch lines through sensing read circuits 10B to 10N in the same way.

The switch unit 20 includes as many switches SW1 to SWn as the number of the sensing read circuit units 10A to 10N, and turns sequentially on them to sequentially transfer the touch sensing output voltages Vout2 to Voutn output from the sensing read circuit units 10A to 10N to the A/D converter 30.

The A/D converter 30 converts and outputs analog touch sensing output voltages Vout2 to Voutn input through these processes into digital signals.

A system control unit (not shown) identifies a vertical coordinate touched on the touch screen panel on the basis of the digital signal output from the A/D converter 30 and a horizontal coordinate on the basis of a signal detected through a drive line or a separately installed horizontal line to determine vertical and horizontal touch coordinates.

For example, if there are 100 drive lines and 100 sensing lines on the touch screen panel, a changed vertical coordinate signal can be output from the sensing read circuit connected to the 30th sensing line. Then, if the 50th drive line signal is applied, the X-axis coordinate is 50 and the Y-axis coordinate is 30. That is, the point where the 50th drive line intersects with the 30th sensing line is determined as a touched region.

However, if there is noise, such a general circuit has a limitation in that its operation is not stable. FIG. 2 is a graph of a result of how the touch sensing output voltage Vout is distorted if there is much noise when a touch is input.

If there is noise when the touch operation is carried, an output of the operational amplifier OP connected to the signal sensing line exceeds a normal operating range, and thus an output waveform may be distorted and it may be difficult to determine the input touch.

FIG. 3 is a view comparing levels of mutual capacitances if a normal touch is carried out, and FIG. 4 is a view comparing levels of mutual capacitances if noise is included when a touch is carried out.

In the case that driving lines are arranged in the X-axis direction and sensing lines are arranged in the Y-axis direction, if a normal touch signal is input, it is possible to identify a touched location because the mutual capacitance of the touched location is relatively small.

However, as shown in FIG. 4, if noise is included when a touch is carried out, it is difficult to read a mutual capacitance from an analog sensing channel that receives a signal from the sensing line. Noise can cause an output to be out of the range of voltages detectable from the analog sensing channel, thereby causing an abnormal mutual capacitance.

BRIEF SUMMARY

Embodiments of the subject invention provide a signal processing circuit of a touch screen, and a method of manufacturing the same, that can smoothly identify touch by using a noise voltage as a driving voltage if noise is carried to a sensing line. Thus, a touched location can be advantageously identified even in the presence of noise.

For example, if it is determined that noise is included, a noise voltage can be used as a driving voltage, and a driving line can be connected to analog sensing channels to be able to identify a corresponding touched location.

Embodiments of the subject invention also provide a method of detecting a touch of a touch screen display, using a signal processing circuit as described herein.

In an embodiment, a signal processing circuit of a touch screen can include: a plurality of driving lines and a plurality of sensing lines arranged to interact with one another in a touch screen panel; power sources respectively supplying power to each of the driving lines; sensing channels respectively connected to the sensing lines, wherein each sensing channel is configured to detect a touch by sensing a mutual capacitance on a node where the respective sensing line interacts with a driving line of the plurality of driving lines; a driving line switch for each driving line, selectively connecting the respective power source to the driving line; a channel switch for each sensing channel, selectively connecting the respective sensing channel to the sensing line; and a bypass line configured to connect a driving line of the plurality of driving lines to a sensing line of the plurality of sensing lines by operation of the respective channel switch.

In another embodiment, a method of detecting a touch of a touch screen can include: providing a signal processing circuit of the touch screen; determining whether noise is present based on a voltage readout by the sensing channels; and if a noise voltage is present, opening the driving line switches such that each power source is disconnected from its respective driving line, and connecting the bypass line to the sensing channel by an operation of the respective channel switch, such that the sensing channel uses the noise voltage as an input voltage; and if a noise voltage is not present, connecting each sensing channel to its respective sensing line, such that one end of the bypass line is open and each sensing channels use the power sources as an input voltage. a plurality of driving lines and a plurality of sensing lines arranged to interact with one another in a touch screen panel. The provided circuit can include: power sources respectively supplying power to each of the driving lines; sensing channels respectively connected to the sensing lines, wherein each sensing channel is configured to detect a touch by sensing a mutual capacitance on a node where the respective sensing line interacts with a driving line of the plurality of driving lines; a driving line switch for each driving line, selectively connecting the respective power source to the driving line; a channel switch for each sensing channel, selectively connecting the respective sensing channel to the sensing line; a bypass line configured to connect a driving line of the plurality of driving lines to a sensing line of the plurality of sensing lines by operation of the respective channel switch; and a distortion detecting unit configured to determine whether noise is present based on a voltage readout by the sensing channels.

DETAILED DESCRIPTION

Reference will now be made in detail to the embodiments of the present disclosure, examples of which are illustrated in the accompanying drawings.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present.

Figure 5:
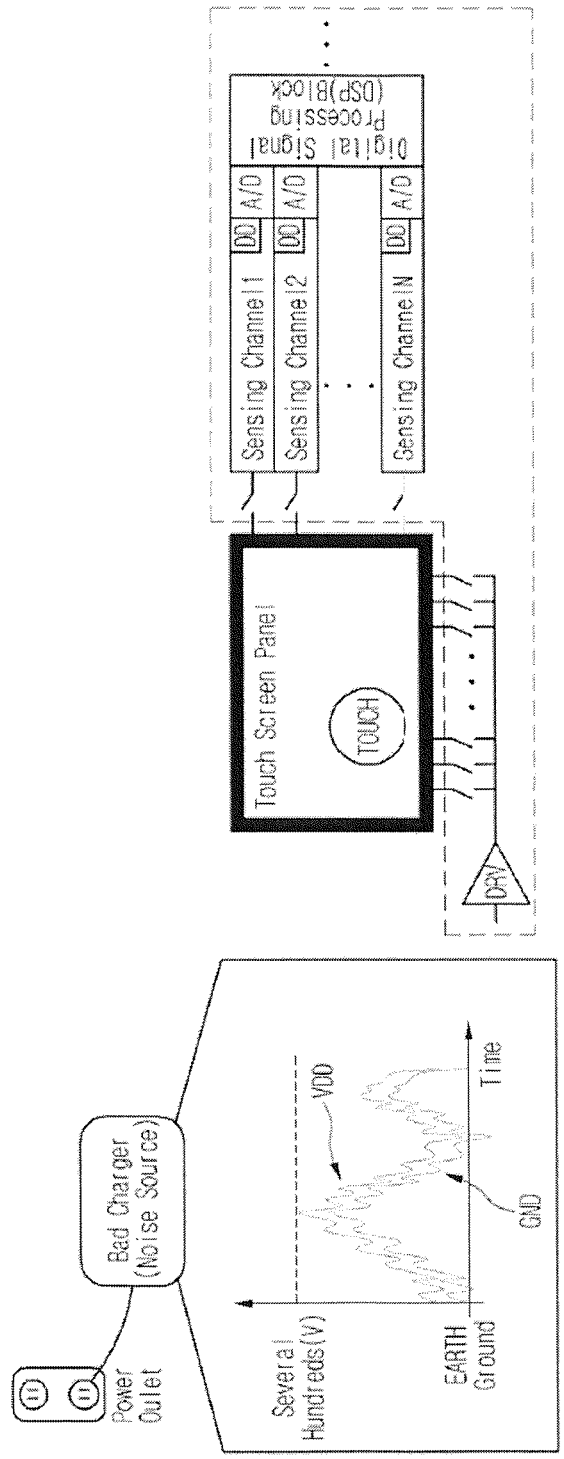
FIGS. 5 and 6 are views of examples of when noise enters a touch screen circuit.
Figure 6:
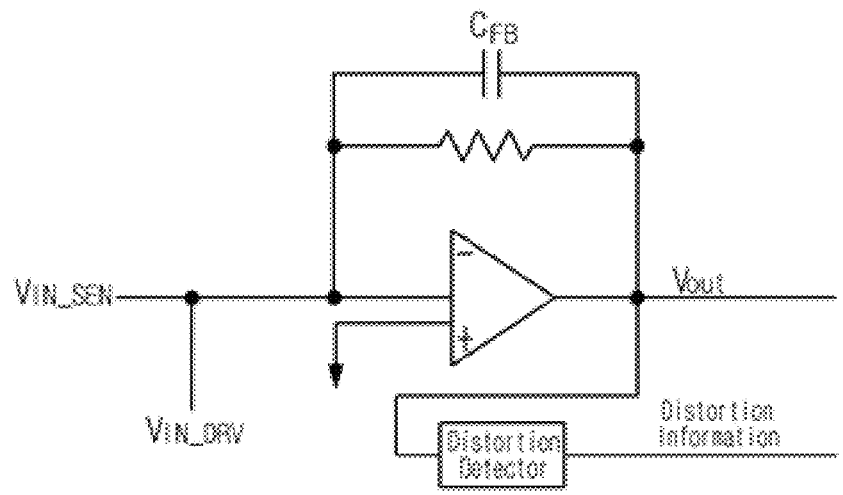

FIGS. 5 and 6 are views of examples of when noise enters a touch screen circuit.

For various reasons, noise may enter a touch screen panel side. For example, if a waveform of supplied power is not regular while electronic equipment with a touch screen is charged, a large amount of noise may be included in a touch input of a user. As another example, when touch is carried out with a wet hand or a user carries out touch due to ambient light, noise occurs (e.g., at a value at which a mutual capacitor $C_M$ sharply increases).

If noise enters the touch screen panel, is the panel can detect whether a voltage Vout is out of an acceptable range at a distortion detector DD of a sensing channel connected to each of sensing lines. In this case, the distortion detector DD can perform a function as a comparator and can be implemented as an analog circuit or firmware.

That is, the sensing channel connected to each of sensing lines can include a distortion detecting unit, such as a comparator for detecting when a value that is out of a normal operating range is output.

If an output waveform of the voltage Vout is distorted or out of a normal operating range by such a distortion detector DD, a control unit (not shown) of a circuit can control operations of switches on driving lines and/or switches on the sensing channel side.

In order to help a reader understand the spirits of the present invention, the terms normal mode and distortion mode will be used below. The term "distortion mode" means when the driving lines are respectively connected to the sensing lines if it is detected by the distortion detector DD that an output waveform of the voltage Vout is distorted.

FIGS. 7 to 11 show sensing lines arranged in the X-axis direction and driving lines arranged in the Y-axis direction. This arrangement is for exemplary purposes only, and embodiments are not limited thereto. In addition, FIGS. 7 to 11 show analog sensing channels that receive signals transferred from each of the sensing lines.

Figure 7:
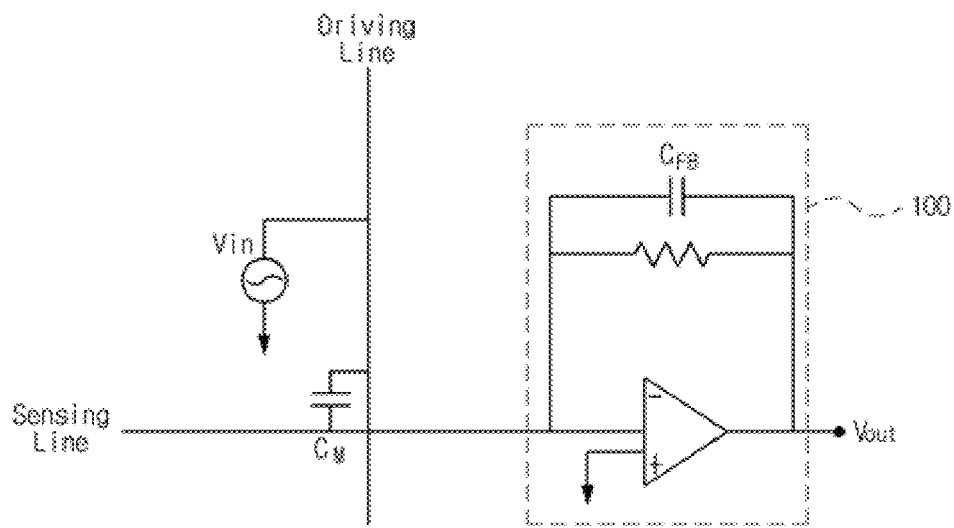
FIG. 7 is a view of a connection of a driving line to a sensing channel in a normal mode.
Figure 8:
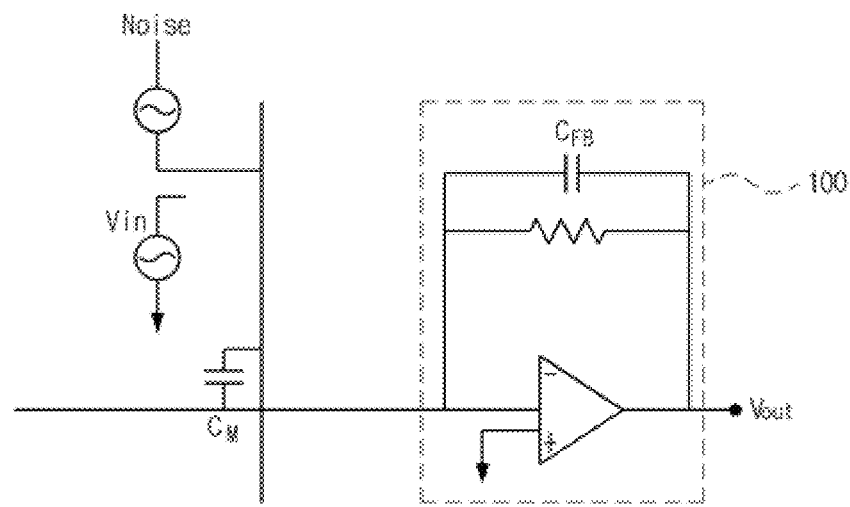
FIG. 8 is a view of a connection of a driving line to a sensing channel in a distortion mode.

FIG. 7 is a view of a connection of a driving line to a sensing channel in a normal mode, and FIG. 8 is a view of a connection of a driving line to a sensing channel in a distortion mode.

The sensing channel can detect touch by sensing a mutual capacitance at a node where the sensing line intersects with the driving line and can include a feedback capacitor $C_{FB}$ and an operational amplifier OP-AMP (shown in FIGS. 7 and 8 as the bottom structure within element 100).

Referring to FIG. 7, if touch is carried out (e.g., by a user's hand or a stylus pen) in the normal mode, a value of the mutual capacitor $C_M$ can decrease and a touched location can be identified by sensing the value of the mutual capacitor $C_M$.

The voltage Vout output from a sensing channel of a sensing line signal including the operational amplifier OP-AMP, resistor, and the capacitor is determined as a ratio of the mutual capacitor $C_M$ to the feedback capacitor $C_{FB}$, as shown in Equation 1.

$$V_{out} = V_{in} \times (C_m / C_{FB})$$  Equation 1:

As in Equation 1 above, the voltage Vout is proportional to the mutual capacitor $C_M$ and inversely proportional to the feedback capacitor $C_{FB}$ of the sensing channel 100. If a distorted signal (e.g., due to noise) enters the sensing channel 100, an output of the operational amplifier of the sensing channel exceeds a normal operating range and as a result, an output waveform of the voltage Vout can be distorted, thereby making it difficult to determine input touch.

In order to inhibit this situation, if it is determined that it is difficult to determine a normal signal due to noise by the distortion detecting unit, embodiments of the present invention use noise as an input voltage instead of a voltage Vin that is input to a driving electrode.

That is, noise is a signal that has a voltage depending on the waveform, and embodiments of the present invention can use noise as an input voltage for detecting the voltage Vout, by using such a noise property. Referring to FIG. 8, a noise voltage instead of the voltage Vin can be provided to the driving electrode.

Figure 1:
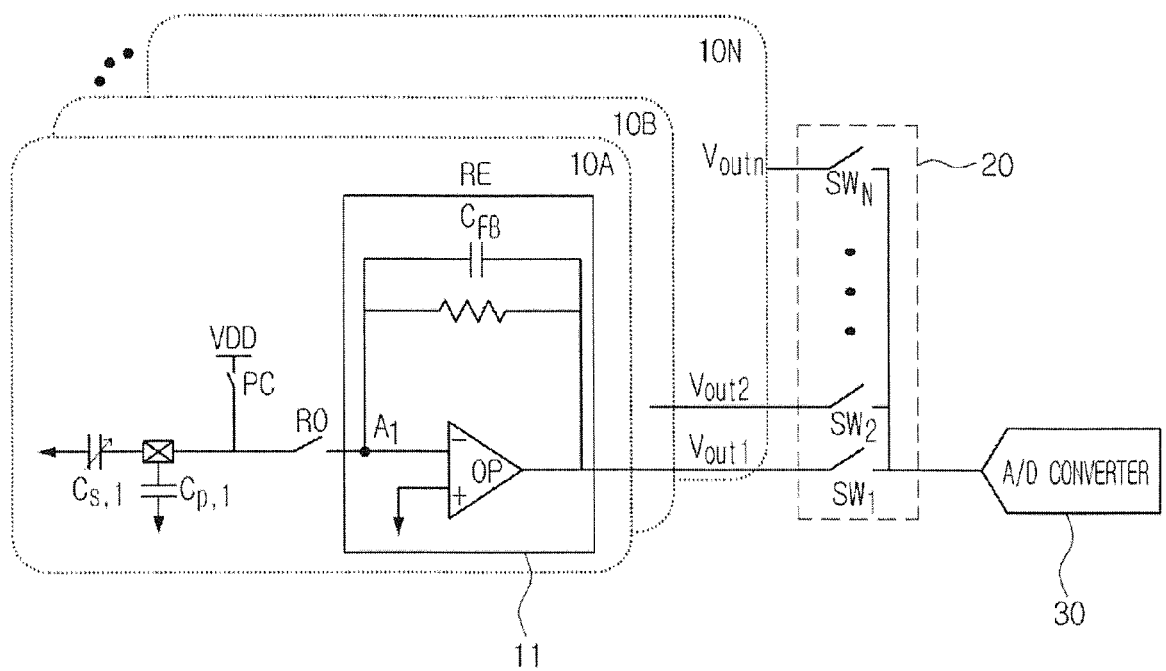
FIG. 1 is a view of a related art sensing line signal processing circuit of a touch screen.
Figure 2:
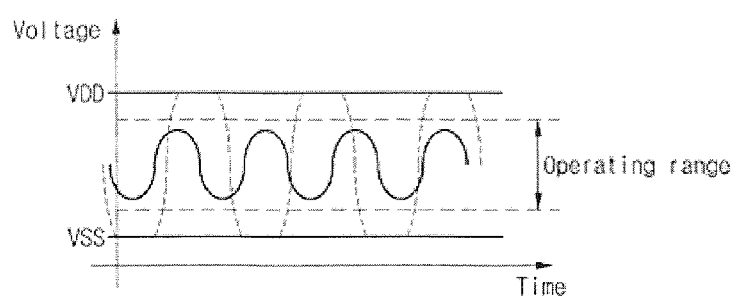
FIG. 2 is a view of when distortion by noise occurs in a sensing channel that is a signal processing circuit of a touch screen sensing line.
Figure 3:
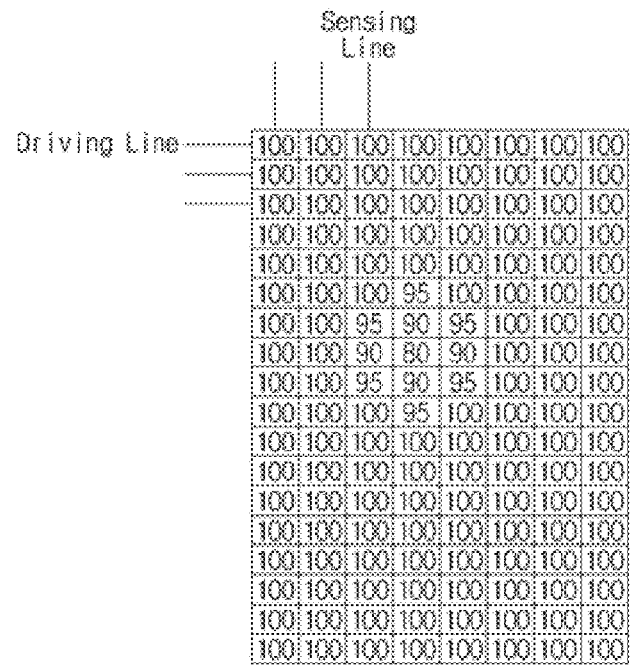
FIG. 3 is a view comparing levels of mutual capacitances if normal touch is carried out.
Figure 4:
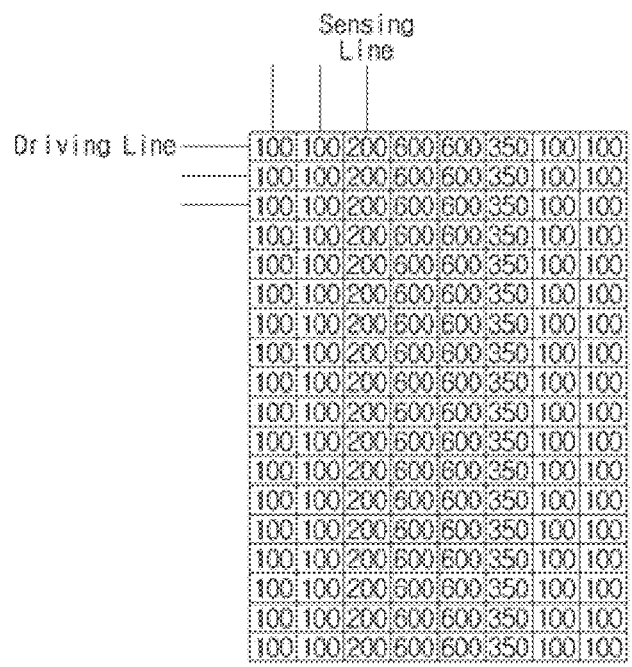
FIG. 4 is a view comparing levels of mutual capacitances if noise is included when touch is carried out.

In addition, in order to identify a touched location for the driving line, the sensing channels connected to the sensing lines can be connected to the driving lines. As described with respect to FIG. 4, this is to detect the touched location by using the driving line because it is difficult to determine an exact touch location on the sensing line if there is noise.

Figure 9:
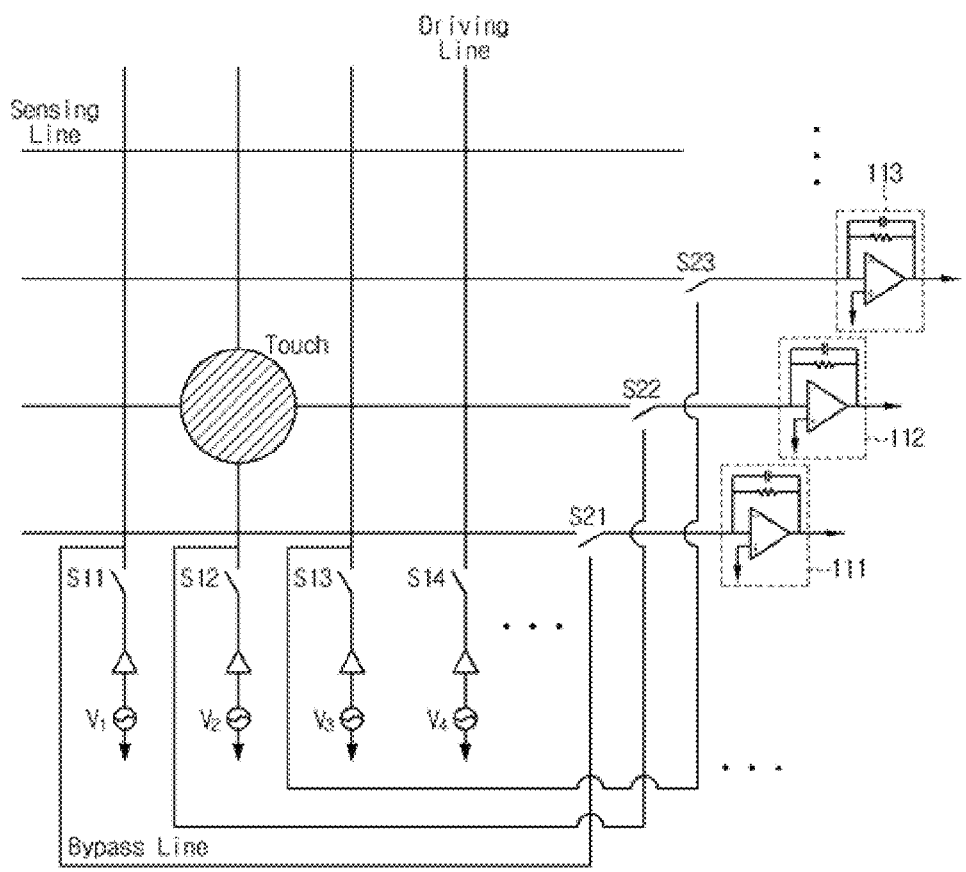
FIG. 9 is a view of a configuration of a signal processing circuit of a touch screen according to an embodiment of the subject invention.
Figure 10:
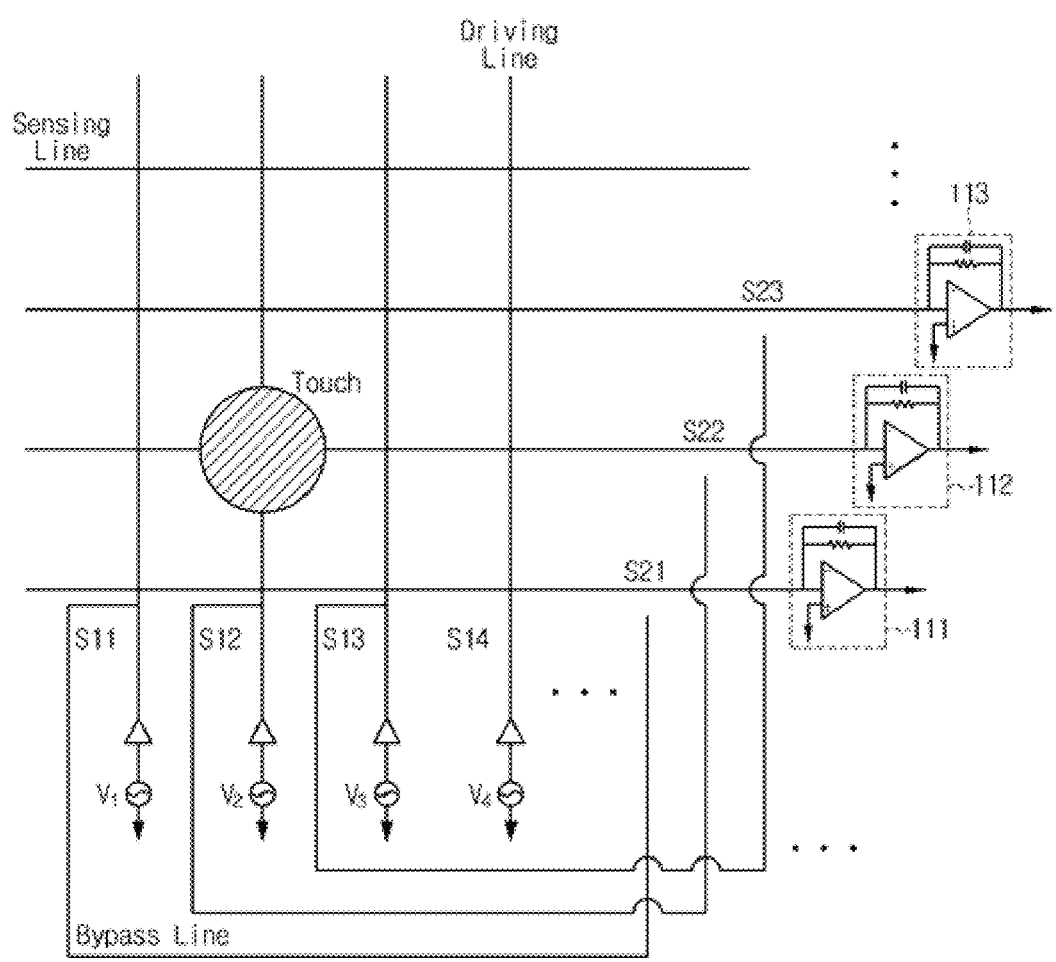
FIG. 10 is a view of when a signal processing circuit according to an embodiment of the subject invention operates in a normal mode.
Figure 11:
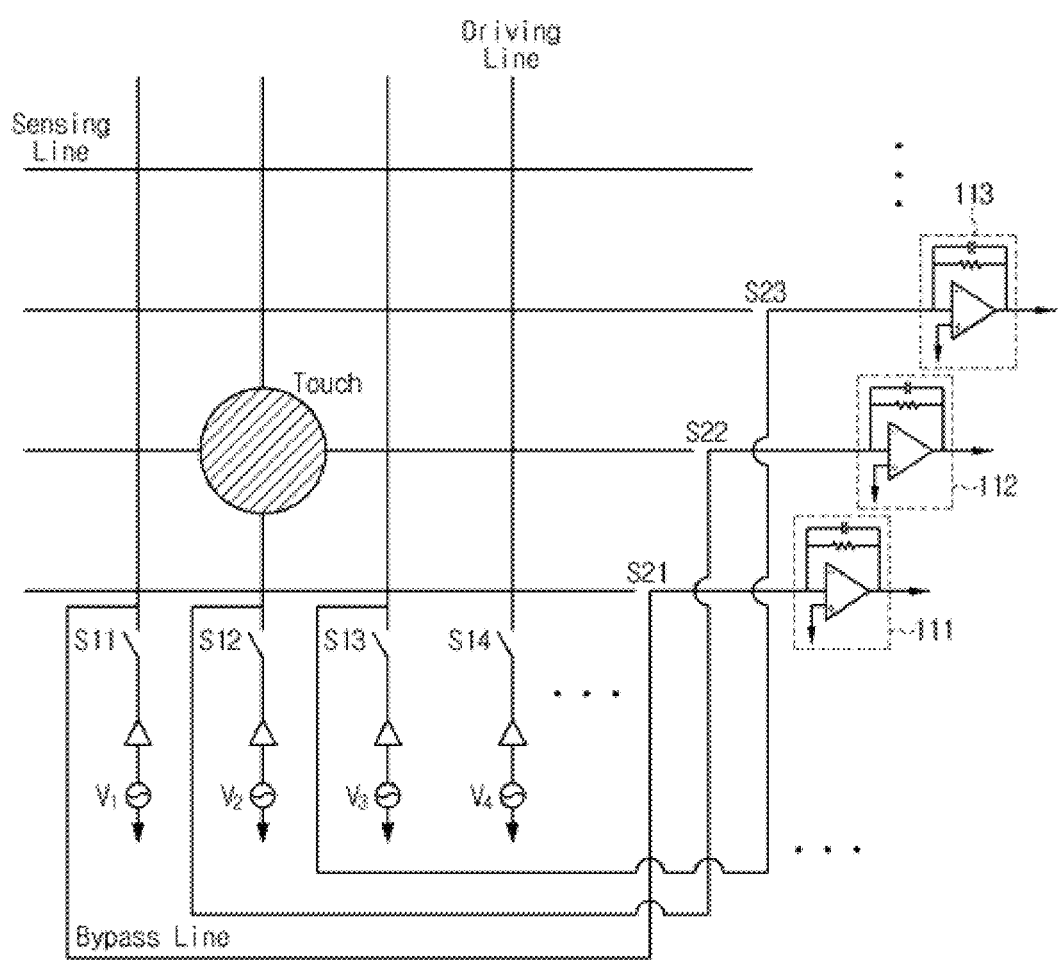
FIG. 11 is a view of when a signal processing circuit according to an embodiment of the subject invention operates in a distortion mode.

FIG. 9 is a view of a configuration of a signal processing circuit of a touch screen according to an embodiment of the subject invention. FIG. 10 is a view of when a signal processing circuit according to an embodiment of the subject invention operates in a normal mode. FIG. 11 is a view of when a signal processing circuit according to an embodiment of the subject invention operates in a distortion mode.

Referring to FIG. 9, sensing lines can be arranged in the X-axis direction and driving lines can be arranged in the longitudinal (Y-axis) direction. In addition, power sources V1, V2, V3, V4 that supply voltages can be connected to each of the driving lines. Though four voltage sources are shown for exemplary purposes, embodiments are not limited thereto. Any reasonable number of voltage sources can be included. In addition, sensing channels 111 to 113 can be connected to each of the sensing lines to determine a touched location by using an output voltage Vout of the sensing line. Though three sensing channels are shown for exemplary purposes, embodiments are not limited thereto. Any reasonable number of sensing channels can be included.

In addition, as described previously, each of the sensing channels can be connected to the distortion detecting unit that is formed as, for example, firmware or an analog circuit, such as a comparator for detecting whether there is noise.

Driving line switches S11, S12, S13, S14 can be arranged between the power sources and the driving lines. The driving line switch allows the driving line to be connected to the power source or to a bypass line. Though four driving line switches are shown for exemplary purposes, embodiments are not limited thereto. Any reasonable number of driving line switches can be included. For example, the number of driving line switches can match the number of voltage sources.

The bypass line can be selectively connected to the sensing channel by the channel switches S21, S22, S23 for each of the sensing channels. Though three channel switches are shown for exemplary purposes, embodiments are not limited thereto. Any reasonable number of channel switches can be included. For example, the number of channel switches can match the number of sensing channels.

By such a configuration, if noise is detected and the signal processing circuit operates in the distortion mode, the bypass line can perform a function of connecting the driving line to the sensing channel so that a noise voltage becomes an input voltage of each sensing channel.

An operation of the signal processing circuit in the normal mode will described with reference to FIG. 10.

Referring to FIG. 10, in the normal mode, the driving line switches S11 to S14 can be connected to the driving lines so that voltages from the power sources V1 to V4 can be input to the driving lines. In addition, the channel switches can be respectively connected to the sensing lines so that the sensing channels are respectively connected to the sensing lines.

In the normal mode, because the channel switches S21 to S23 connected to the sensing channels are connected to the sensing lines, one end of the bypass line is open.

In addition, in the normal mode, voltages Vin can be input from each of the power sources V1 to V4 to the driving lines, and the sensing channels connected to each of the sensing lines can determine level of voltages Vout by using the mutual capacitance, the voltage Vin, and the feedback capacitor $C_{FB}$.

However, if noise enters the touch panel simultaneously with user touch, it can be difficult to accurately measure the mutual capacitance on the sensing lines around a touched region. That is, if the voltage on the sensing channel is out of an acceptable range, the mutual capacitances of the sensing lines around the touched region can abnormally increase.

In this case, the distortion detecting unit can determine if there is noise, and the signal processing circuit according to embodiments of the present invention can be operated in the distortion mode by the control unit for controlling the plurality of switches on the circuit.

Referring to FIG. 11, the driving line switches S11 to S14 can be open so that the power sources V1 to V4 are not connected to the driving lines. In addition, the channels S21 to S23 can be respectively connected to the bypass lines.

By such a switching operation, the driving line can be connected to the bypass line which is connected to the sensing line.

Due to such a circuit configuration, the noise voltage can become an input voltage in an aspect of the sensing channel, and thus it is advantageously possible to identify a touched location on the driving line by using a voltage sensed from the sensing channel.

Accordingly, embodiments of the present invention have an advantage in that if there is noise, it is possible to normally identify touch by arranging a switching unit and lines connected to switches without forming an additional circuit to normally identify touch.

The signal processing circuit as suggested has an advantage in that it is possible to identify a touched location if noise is included. That is, sensing channels for deriving a voltage output from the sensing line can be respectively connected to driving lines, and a voltage of noise can be used as an input voltage. Thus, it is possible to scan each of the driving lines and as a result, it is possible to identify a touched location even when noise is present.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

What is claimed is:

1. A signal processing circuit of a touch screen, comprising:
   a plurality of driving lines and a plurality of sensing lines arranged to interact with one another in a touch screen panel;
   power sources respectively supplying power to each of the driving lines;
   sensing channels respectively connected to the sensing lines, wherein each sensing channel is configured to detect a touch by sensing a mutual capacitance on a node where the respective sensing line interacts with a driving line of the plurality of driving lines;
   a driving line switch for each driving line, selectively connecting the respective power source to the driving line;
   a channel switch for each sensing channel, selectively connecting the respective sensing channel to the sensing line; and
   a bypass line configured to connect a driving line of the plurality of driving lines to a sensing line of the plurality of sensing lines by operation of the respective channel switch, wherein the bypass line is configured such that, when the channel switch is connecting its respective sensing channel to the respective sensing line one end of the bypass line is open.

2. The signal processing circuit according to claim 1, wherein the bypass line is also configured to connect a driving line of the plurality of driving lines to a sensing line of the plurality of sensing lines by operation of the respective driving line switch.

3. The signal processing circuit according to claim 1, wherein the signal processing unit is configured such that, if the driving line switches are open such that each power source is disconnected from its respective driving line, and the bypass line is connected to the sensing channel by an operation of the respective channel switch, the sensing channel then uses a noise voltage as an input voltage.

4. The signal processing circuit according to claim 3, further comprising a distortion detecting unit configured to determine whether noise is present based on a voltage readout of the sensing channels.

5. The signal processing circuit according to claim 4, wherein the distortion detecting unit is formed as an analog circuit including a comparator or is implemented as firmware.

6. The signal processing circuit according to claim 1, wherein the signal processing unit is configured such that, if the driving lines switch open such that each power source is disconnected from its respective driving line, and the bypass line is connected to the sensing channel by an operation of the respective channel switch, the sensing channel then uses a noise voltage as an input voltage.

7. The signal processing circuit according to claim 1, comprising a plurality of bypass lines, one for each driving line.

8. The signal processing circuit according to claim 7, comprising an equal number of driving lines and sensing lines.

9. The signal processing circuit according to claim 1, wherein the signal processing unit is configured such that, if the driving line switches are open such that each power source is disconnected from its respective driving line, and each bypass line is connected to its respective sensing channel by an operation of the respective channel switch, the sensing channels then use a noise voltage as an input voltage.

10. The signal processing circuit according to claim 9, further comprising a distortion detecting unit configured to determine whether noise is present based on a voltage readout of the sensing channels.

11. A method of detecting a touch of a touch screen, the method comprising:
    providing a signal processing circuit of the touch screen, the signal processing circuit comprising:
    a plurality of driving lines and a plurality of sensing lines arranged to interact with one another in a touch screen panel;
    power sources respectively supplying power to each of the driving lines;
    sensing channels respectively connected to the sensing lines, wherein each sensing channel is configured to detect a touch by sensing a mutual capacitance on a node where the respective sensing line interacts with a driving line of the plurality of driving lines;
    a driving line switch for each driving line, selectively connecting the respective power source to the driving line;
    a channel switch for each sensing channel, selectively connecting the respective sensing channel to the sensing line;
    a bypass line configured to connect a driving line of the plurality of driving lines to a sensing line of the plurality of sensing lines by operation of the respective channel switch; and
    a distortion detecting unit configured to determine whether noise is present based on a voltage readout by the sensing channels;
    determining whether noise is present based on a voltage readout by the sensing channels; and
    if a noise voltage is present, opening the driving line switches such that each power source is disconnected from its respective driving line, and connecting the bypass line to the sensing channel by an operation of the respective channel switch, such that the sensing channel uses the noise voltage as an input voltage;
    if a noise voltage is not present, connecting each sensing channel to its respective sensing line, such that one end of the bypass line is open and each sensing channels use the power sources as an input voltage.

12. The method according to claim 11, wherein the distortion detecting unit is formed as an analog circuit including a comparator or is implemented as firmware.

13. The method according to claim 11, wherein the signal processing circuit comprises a plurality of bypass lines, one for each driving line.

14. The signal processing circuit according to claim 13, wherein the signal processing circuit comprises an equal number of driving lines and sensing lines.

15. The method according to claim 13, wherein each bypass line is configured such that, when the channel switch is connecting its respective sensing channel to the respective sensing line, one end of the bypass line is open.

16. The method according to claim 13, if a noise voltage is present, each bypass line is connected to a sensing channel by an operation of the respective channel switch.

17. A signal processing circuit of a touch screen, comprising:
- a plurality of driving lines and a plurality of sensing lines arranged to interact with one another in a touch screen panel;
- power sources respectively supplying power to each of the driving lines;
- sensing channels respectively connected to the sensing lines, wherein each sensing channel is configured to detect a touch by sensing a mutual capacitance on a node where the respective sensing line interacts with a driving line of the plurality of driving lines;
- a driving line switch for each driving line, selectively connecting the respective power source to the driving line;
- a channel switch for each sensing channel, selectively connecting the respective sensing channel to the sensing line; and
- a plurality of bypass lines, one for each driving line, configured to connect a driving line of the plurality of driving lines to a sensing line of the plurality of sensing lines by operation of the respective channel switch, wherein each bypass line is configured such that, when the channel switch is connecting its respective sensing channel to the respective sensing line, one end of the bypass line is open.

18. The signal processing circuit according to claim 17, wherein the signal processing unit is configured such that, if the driving line switches are open such that each power source is disconnected from its respective driving line, and each bypass line is connected to its respective sensing channel by an operation of the respective channel switch, the sensing channels then use a noise voltage as an input voltage.

19. The signal processing circuit according to claim 18, further comprising a distortion detecting unit configured to determine whether noise is present based on a voltage readout of the sensing channels.

20. The signal processing circuit according to claim 17, wherein the bypass line is also configured to connect a driving line of the plurality of driving lines to a sensing line of the plurality of sensing lines by operation of the respective driving line switch.

\* \* \* \* \*